United States Patent

Koishi et al.

[11] Patent Number: 5,894,379
[45] Date of Patent: Apr. 13, 1999

[54] MAGNETIC HEAD SLIDER WITH RAIL LEADING PORTIONS INCREASING IN THICKNESS OVER RAIL PORTIONS WHICH WIDEN AND NARROW

[75] Inventors: Ryosuke Koishi; Seiji Yoneoka, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/562,015

[22] Filed: Nov. 22, 1995

[30] Foreign Application Priority Data

Mar. 17, 1995 [JP] Japan ................... 7-059544

[51] Int. Cl.⁶ .................................................. G11B 5/60
[52] U.S. Cl. .................................................. 360/103
[58] Field of Search .............................. 360/103, 122

[56] References Cited

U.S. PATENT DOCUMENTS

| | | | |
|---|---|---|---|
| 4,549,232 | 10/1985 | Axmear et al. | 360/77.07 |
| 5,062,017 | 10/1991 | Strom et al. | 360/103 |
| 5,196,973 | 3/1993 | Chapin et al. | 360/103 |
| 5,212,608 | 5/1993 | Yoneoka | 360/103 |
| 5,396,386 | 3/1995 | Bolasna et al. | 360/103 |
| 5,430,591 | 7/1995 | Takeuchi et al. | 360/103 |
| 5,488,524 | 1/1996 | Cunningham | 360/103 |
| 5,515,219 | 5/1996 | Ihrke et al. | 360/103 |
| 5,568,981 | 10/1996 | Nepela et al. | 360/103 |
| 5,636,086 | 6/1997 | Bolasna et al. | 360/103 |
| 5,726,830 | 3/1998 | Koishi et al. | 360/103 |

FOREIGN PATENT DOCUMENTS

| | | | |
|---|---|---|---|
| 0237752 | 9/1987 | European Pat. Off. | 360/103 |
| 0432733 | 6/1991 | European Pat. Off. | 360/103 |
| 60-187980 | 9/1985 | Japan . | |
| 61-000980 | 1/1986 | Japan | 360/103 |
| 61-148684 | 7/1986 | Japan . | |
| 62-14386 | 1/1987 | Japan . | |
| 02-101688 | 4/1990 | Japan . | |
| 03-132981 | 6/1991 | Japan . | |
| 04-057259 | 2/1992 | Japan | 360/103 |
| 04-159671 | 6/1992 | Japan . | |
| 2278485 | 11/1994 | United Kingdom | 360/103 |

OTHER PUBLICATIONS

Japanese Patent Abstract of 05-325464 to Y. Kadowaki entitled "Floating Slider", Dec. 10, 1993.

Primary Examiner—Craig A. Renner
Attorney, Agent, or Firm—Greer, Burns & Crain, Ltd.

[57] ABSTRACT

A slider body of a magnetic head slider has a leading end located upstream of an air flow generated between the slider body and a magnetic recording medium, a trailing end located downstream of the air flow, and a floating surface opposed to the magnetic recording medium. At least two rails for generating a floating force are provided on the floating surface of the slider body. A magnetic head for reading/writing data is provided at the trailing end of the slider body. A groove formed between the rails is changed in width from the leading end toward the trailing end, thereby generating an attractive force between the floating surface and the magnetic recording medium. Each of the rails has a tapering portion increased in thickness from the leading end toward the trailing end. The tapering portion terminates at a position where each rail is decreased in width from the leading end toward the trailing end. This magnetic head slider is improved in that its floating characteristics are less influenced by working variations of the tapering portion.

11 Claims, 10 Drawing Sheets

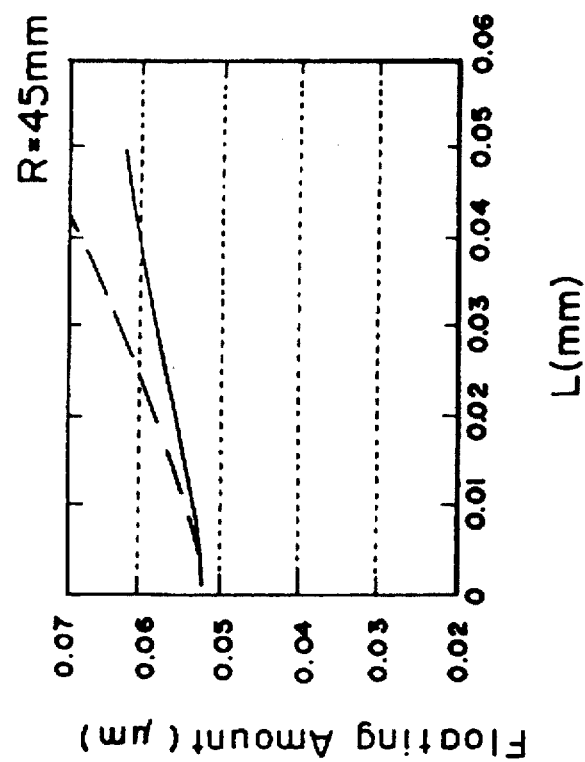
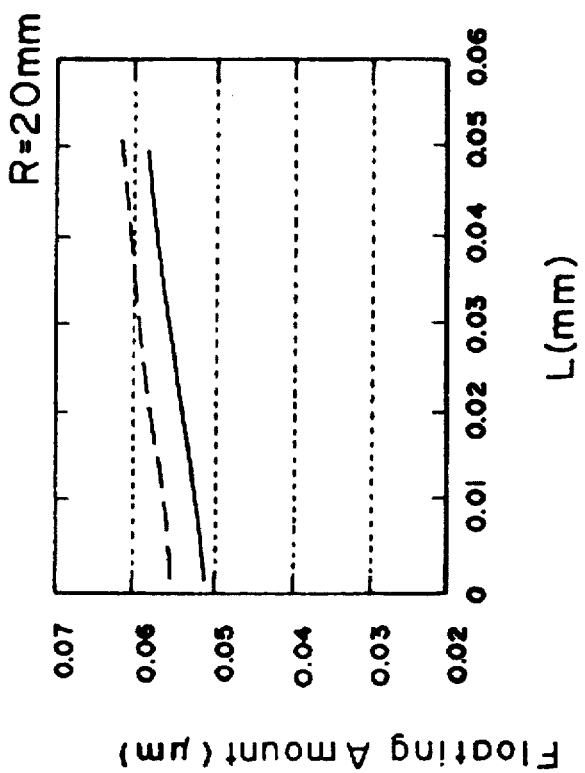

MAGNETIC HEAD SLIDER WITH RAIL LEADING PORTIONS INCREASING IN THICKNESS OVER RAIL PORTIONS WHICH WIDEN AND NARROW

BACKGROUND OF THE INVENTION

1. Field of the Invention

The present invention relates to a negative pressure type of magnetic head slider for use in a magnetic storage device such as a magnetic disk drive.

2. Description of the Related Art

In a recent magnetic head slider for a magnetic disk drive, a reduction in floating amount of the slider has been advanced in order to increase a recording density. Further, the slider is required to have a superior floating stability because a large acceleration by high-speed access is applied in an access direction. Further, a rotary positioner is widely used in response to size reduction of the magnetic disk drive and simplification of mechanisms, requiring a magnetic head slider with reduced variations in floating amount due to a change in yaw angle.

A known negative pressure type of magnetic head slider superior in floating stability includes a slider body having a leading end located upstream of an air flow generated between the slider body and a magnetic recording medium, a trailing end located downstream of the air flow, and a floating surface opposed to the magnetic recording medium; at least two rails provided on the floating surface of the slider body, for generating a floating force; and a magnetic head provided at the trailing end of the slider body, for reading/writing data. In this magnetic head slider, a groove formed between the rails is changed in width from the leading end toward the trailing end, thereby generating an attractive force (negative force) between the floating surface and the magnetic recording medium. One of the features of such a conventional magnetic head slider is that the width of each rail is narrowed on the side of the leading end. Another feature is, for example, that a taper is formed at a portion of each rail on the side of the leading end. The presence of the taper can suppress floating fluctuations when dust or the like is deposited on the rails.

The formation of the taper on each rail is performed usually by machining. Accordingly, variations in tapering, e.g., variations in length of the taper, have a large influence upon the floating characteristics of the magnetic head slider. Thus, in the conventional magnetic head slider, high-precision working is required to form the taper, causing a hindrance to cost reduction.

SUMMARY OF THE INVENTION

It is therefore an object of the present invention to provide a magnetic head slider which has floating characteristics less influenced by variations in tapering.

According to the present invention, there is provided a magnetic head slider comprising a slider body having a leading end located upstream of an air flow generated between the slider body and a magnetic recording medium, a trailing end located downstream of the air flow, and a floating surface opposed to the magnetic recording medium; at least two rails provided on the floating surface of the slider body, for generating a floating force; and a magnetic head provided at the trailing end of the slider body, for reading/writing data; wherein a groove formed between the rails is changed in width from the leading end toward the trailing end, thereby generating an attractive force between the floating surface and the magnetic recording medium; each of the rails has a tapering portion increased in thickness from the leading end toward the trailing end; and the tapering portion terminates at a position where each of the rails is decreased in width from the leading end toward the trailing end.

In the magnetic head slider of the present invention, the tapering portion terminates at a position where each rail is decreased in width from the leading end toward the trailing end. Accordingly, the floating characteristics of the magnetic head slider is less influenced by variations in length of the tapering portion.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 11A and 11B are graphs showing the floating characteristics in the case where the tapering angle is 1.5°.

DETAILED DESCRIPTION OF THE PREFERRED EMBODIMENTS

Some preferred embodiments of the present invention will now be described with reference to the attached drawings.

Figure 1:
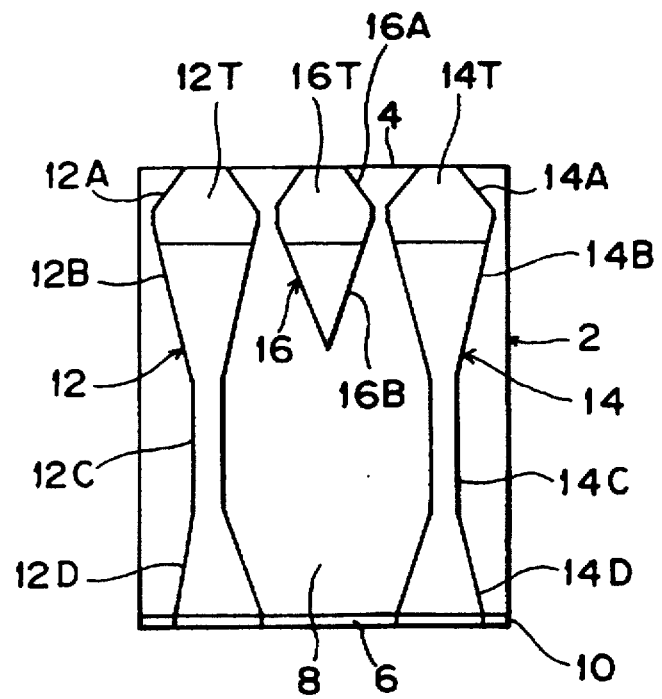
FIG. 1 is a plan view of a magnetic head slider showing a first preferred embodiment of the present invention.
Figure 2:
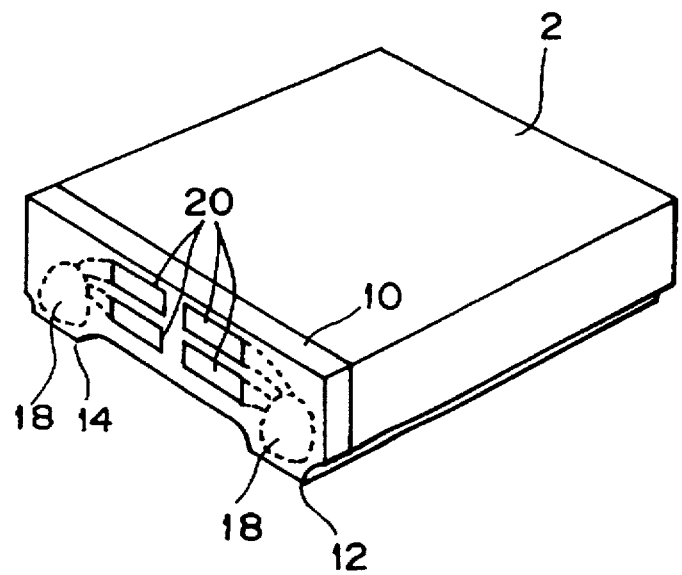
FIG. 2 is a perspective view of the magnetic head slider shown in FIG. 1 as seen from the upper side thereof.
Figure 3:
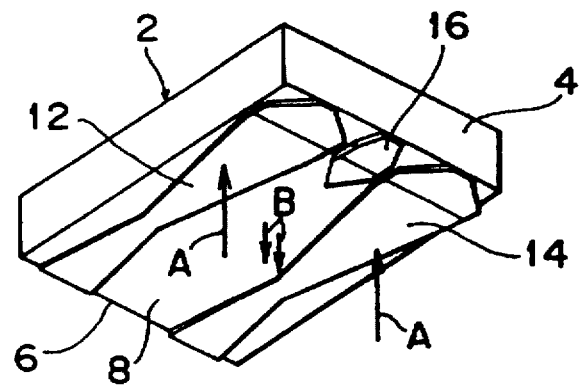
FIG. 3 is a perspective view of the magnetic head slider shown in FIG. 1 as seen from the lower side thereof.

FIG. 1 is a plan view of a magnetic head slider showing a first preferred embodiment of the present invention; FIG. 2 is a perspective view of the slider as seen from the upper side thereof; and FIG. 3 is a perspective view of the slider as seen from the lower side thereof. Reference numeral 2 denotes a slider body having a shape of substantially rectangular parallelepiped. The slider body 2 is formed of $Al_2O_3$—TiC, for example. The slider body 2 has a leading end 4 located upstream of an air flow generated between the slider body 2 and a magnetic recording medium not shown (e.g., a magnetic disk to be rotationally driven), a trailing end 6 located downstream of the air flow, and a floating surface 8 opposed to the magnetic recording medium. The trailing end 6 of the slider body 2 is provided with a magnetic head portion 10 for reading/writing data.

The floating surface 8 of the slider body 2 is provided with at least two rails for generating a floating force. In this preferred embodiment wherein the magnetic recording medium is a magnetic disk to be rotationally driven, the rails include an inner side rail 12 located on the radially inner side of the magnetic disk, an outer side rail 14 located on the radially outer side of the magnetic disk, and a leading end center rail 16 provided between the inner and outer side rails 12 and 14 on the leading end 4 side. Although not shown, a trailing end center rail may further be provided so as to correspond to the leading end center rail 16. The inner side rail 12 is composed of a first portion 12A having a width increased in a direction from the leading end 4 to the trailing end 6, a second portion 12B having a width decreased in this direction, a third portion 12C having a width constant in this direction, and a fourth portion 12D having a width increased in this direction. The first to fourth portions 12A to 12D are formed integrally and extend continuously from the leading end 4 to the trailing end 6. The outer side rail 14 is formed at a position symmetrical with that of the inner side rail 12 and has a shape symmetrical with that of the inner side rail 12 with respect to a longitudinal center line of the slider body 2. Thus, the outer side rail 14 is composed of a first portion 14A, a second portion 14B, a third portion 14C, and a fourth portion 14D respectively symmetrical with the first, second, third, and fourth portions 12A, 12B, 12C, and 12D of the inner side rail 12. The leading end center rail 16 is composed of a first portion 16A having a width increased in the direction from the leading end 4 to the trailing end 6 and a second portion 16B having a width decreased in this direction.

As shown in FIG. 2, the magnetic head portion 10 incorporates two magnetic heads 18 of a thin-film type, for example, at the positions corresponding to the inner side rail 12 and the outer side rail 14 at the trailing end 6. Reference numerals 20 denote signal terminals of the magnetic heads 18.

When the magnetic recording medium is moved relative to the magnetic head slider from the leading end 4 toward the trailing end 6, an air flow directed from the leading end 4 toward the trailing end 6 is generated, so that both a floating force by a positive pressure as shown by arrows A in FIG. 3 and an attractive force by a negative pressure as shown by arrows B in FIG. 3 act on the magnetic head slider. The action of the negative pressure is due to the structure that the width of a groove formed between the rails is changed in the direction from the leading end toward the trailing end.

Referring again to FIG. 1, the inner side rail 12, the outer side rail 14, and the leading end center rail 16 have leading portions 12T, 14T, and 16T, respectively, on the leading end 4 side. The leading portions 12T, 14T, and 16T increase in thicknesses in the direction from the leading end 4 toward the trailing end 6. The remaining portion (trailing portion) of each rail is a flat surface parallel to the floating surface 8. The tapering angle of each tapering portion is set to between 0.5° and 4.0°, and the length of each tapering portion is set to between 1/10 and 1/20 of the whole length of each side rail. The formation of the leading portion on each rail allows prevention of deposition of dirt on the front end of each rail due to the positive pressure generated by the gradual increase in thickness.

In this preferred embodiment, the leading portions 12T and 14T of the side rails 12 and 14 terminate on the second portions 12B and 14B gradually decreased in width from the leading end 4 toward the trailing end 6, respectively. The leading portion 16T of the leading end center rail 16 also terminates on the second portion 16B gradually decreased in width from the leading end 4 toward the trailing end 6. In this manner, the leading portion of each rail terminates on the portion of each rail gradually decreased in width from the leading end toward the trailing end, thereby allowing suppression of floating fluctuations even if there are variations in length of each tapering portion due to working tolerance. The size of the slider is as small as 2 mm×1.6 mm or 1.25 mm×1 mm, and the width of the narrowest portion of each rail is set to between one hundred and several tens of micrometers. Accordingly, each rail is formed by applying a photolithography technique. That is, desired rail patterns are formed by a resist, and the groove between the rails is then formed by ion milling. The leading portions are formed by machining, for example, before or after forming each rail.

Figure 4:
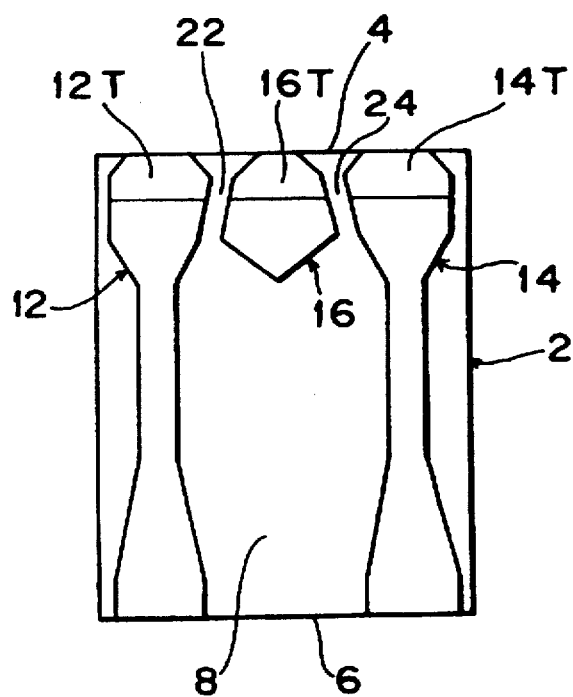
FIG. 4 is a plan view of a magnetic head slider showing a second preferred embodiment of the present invention.

FIG. 4 is a plan view of a magnetic head slider showing a second preferred embodiment of the present invention. Throughout all the drawings, substantially the same parts are denoted by the same reference numerals, and the magnetic head portion is not shown in FIG. 4 and the following figures for the sake of clarity of drawing. In this preferred embodiment, both a first narrow groove 22 formed between the inner side rail 12 and the leading end center rail 16 and a second narrow groove 24 formed between the outer side rail 14 and the leading end center rail 16 are not parallel to the side surfaces of the slider body 2. Further, the leading portions 12T and 14T of the inner and outer side rails 12 and 14 terminate on the portions of the side rails 12 and 14 which gradually decrease in width from the leading end 4 toward the trailing end 6 as similar to the first preferred embodiment, and the leading portion 16T of the leading end center rail 16 terminates on the portion of the center rail 16 increased in width from the leading end 4 toward the trailing end 6 unlike the first preferred embodiment.

The formation of the narrow grooves 22 and 24 causes a structure that the narrowest portions between the rails is inclined with respect to the side surfaces of the slider body 2, thereby increasing the rates of compression and expansion of the air flow and easily providing a negative-pressure slider having a high rigidity. Further, the terminating position of each leading portion is decided as mentioned above, thereby reducing the influence of variations in formation of the leading portion upon the floating characteristics. Even the inclination of such narrow grooves can exhibit the effect. Another preferred embodiment employing this structure will now be described with reference to FIG. 5.

Figure 5:
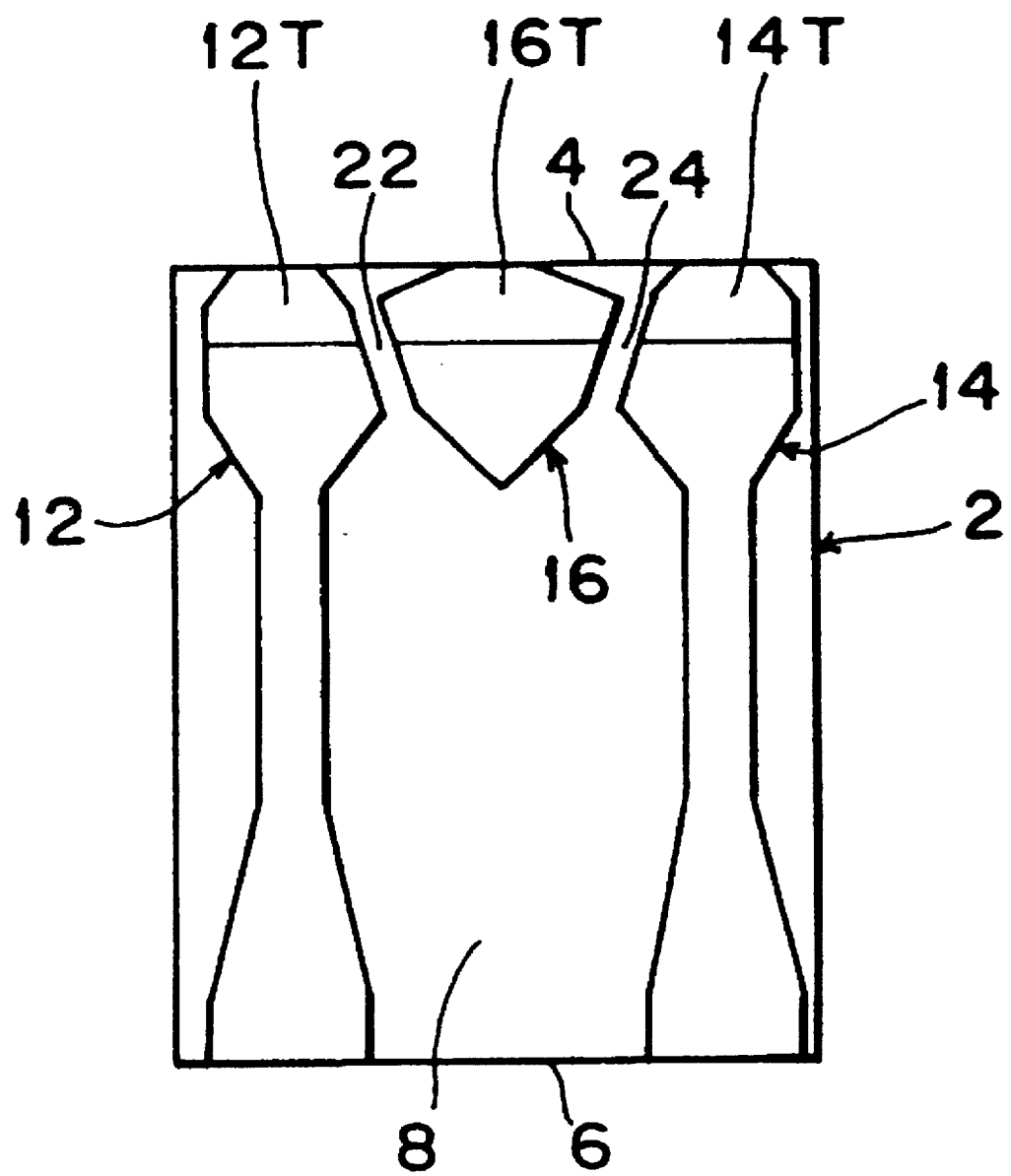
FIG. 5 is a plan view of a magnetic head slider showing a third preferred embodiment of the present invention.

FIG. 5 is a plan view of a magnetic head slider showing a third preferred embodiment of the present invention. In this preferred embodiment, the leading portions 12T and 14T of the inner and outer side rails 12 and 14 terminate on the portions of the side rails 12 and 14 increased in width from the leading end 4 toward the trailing end 6 unlike the second preferred embodiment, and the leading portion 16T of the leading end center rail 16 terminates on the portion of the center rail 16 decreased in width from the leading end 4 toward the trailing end 6 unlike the second preferred embodiment. As similar to the second preferred embodiment, the first and second narrow grooves 22 and 24 formed between the inner side rail 12 and the leading end center rail 16 and between the outer side rail 14 and the leading end center rail 16, respectively, are not parallel to the side surfaces of the slider body 2. With this arrangement, the narrowest portions between the rails are inclined with respect to the side surfaces of the slider body 2, thereby increasing the rates of compression and expansion of the air flow and easily providing a negative-pressure slider having a high rigidity.

In the case of using a rotary positioner, the magnetic head slider is sometimes offset at several degress in angle in mounting it on an arm of the positioner, so as to suppress variations in floating amount of the slider due to variations in yaw angle, whereby a point at which the yaw angle is 0° is set in the vicinity of the center of a data surface of a magnetic disk to thereby reduce the maximum value of the yaw angle. However, in such a case where the slider is offset, it is necessary to use timing servo as disclosed in U.S. Pat. No. 4,549,232, for example. If the timing servo is not used, it is difficult to perform servo control. Accordingly, there is a case where the slider is not offset. In this case, when the movable range of the rotary positioner is 100, the range of the yaw angle becomes 7°/–9° to –3°/–19°, thus deteriorating the floating characteristics (especially, rolling characteristics).

This problem can be solved, for example, in the third preferred embodiment shown in FIG. 5, by making the shapes of the inner side rail 12 and the outer side rail 14 unsymmetrical with respect to each other, or by deviating the positions of the inner side rail 12 and the outer side rail 14 to either side of the slider body 2. Specific embodiments employing this arrangement will now be described.

FIGS. 6A to 6D and FIGS. 7A to 7D show fourth to eleventh preferred embodiments of the present invention which can improve the rolling characteristics. In each figure, "inner" means the radially inner side of a magnetic disk to be rotationally driven, and "outer" means the radially outer side of the magnetic disk.

Figure 6A:
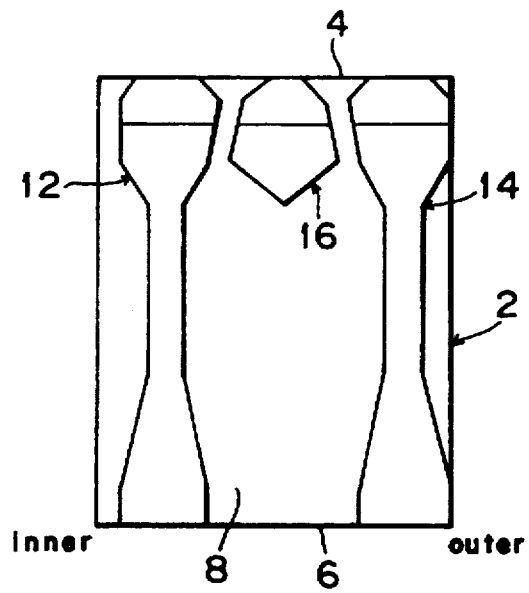
FIGS. 6A to 6D are plan views of magnetic head sliders showing fourth to seventh preferred embodiments of the present invention, respectively.
Figure 6B:
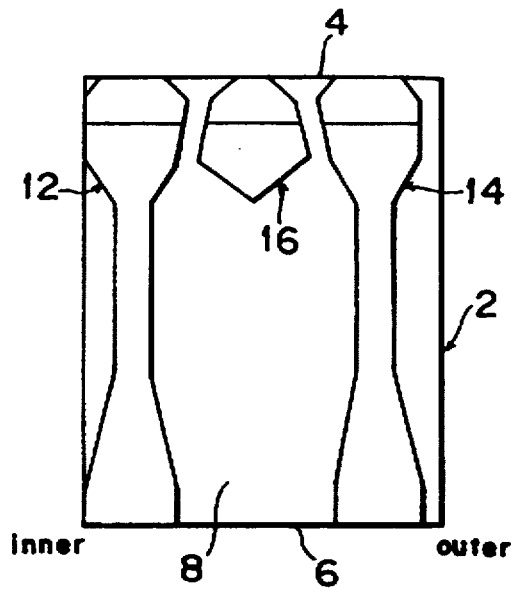

The fourth and fifth preferred embodiments shown in FIGS. 6A and 6B, respectively, are characterized in that the positions of the inner side rail 12 and the outer side rail 14 are deviated to either side of the slider body 2. In the fourth preferred embodiment shown in FIG. 6A, each rail is deviated to the outer side of the slider body 2, thereby making the width between the inner side rail 12 and the inner side surface of the slider body 2 (this width will be hereinafter referred to as the side space of the inner side rail 12) larger than the width between the outer side rail 14 and the outer side surface of the slider body 2 (this width will be referred to as the side space of the outer side rail 14). With this arrangement, even when the yaw angle is set larger in one direction, the rolling of the magnetic head slider can be suppressed by an attractive force generating in the side space of the outer side rail 14. In the fifth preferred embodiment shown in FIG. 6B, each rail is deviated to the inner side of the slider body 2, thereby making the side space of the outer side rail 14 larger than the side space of the inner side rail 12. With this arrangement, even when the yaw angle is set larger in one direction, the rolling of the magnetic head slider can be suppressed by a positive pressure generating in the side space of the outer side rail 14.

Figure 6C:
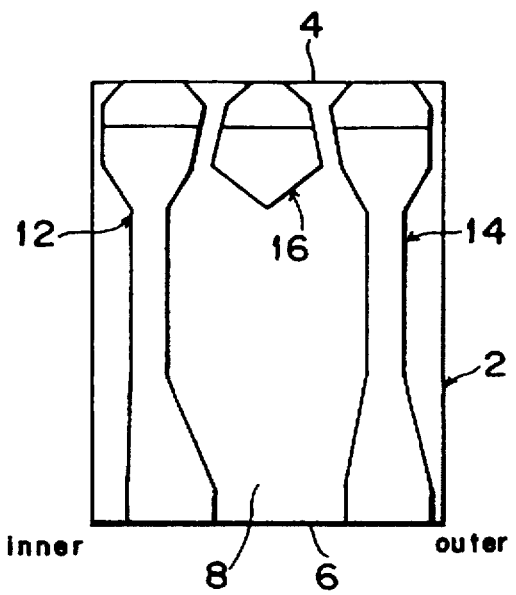
Figure 6D:
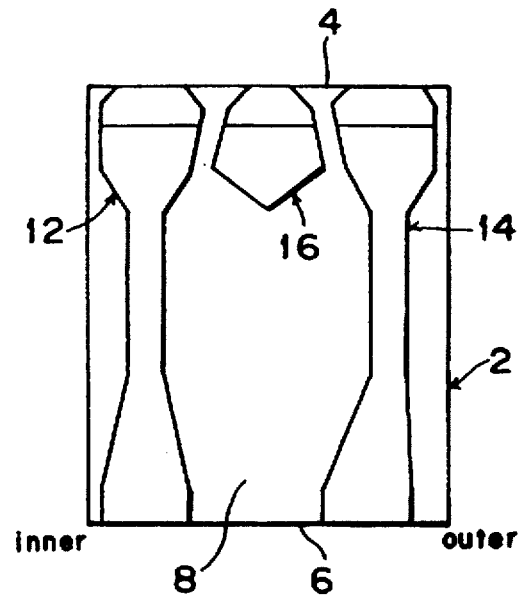

The sixth and seventh preferred embodiments shown in FIGS. 6C and 6D, respectively, and the eighth, ninth, tenth, and eleventh preferred embodiments shown in FIGS. 7A, 7B, 7C, and 7D, respectively, are characterized in that the shapes of the inner side rail 12 and the outer side rail 14 are unsymmetrical with each other. In the sixth preferred embodiment shown in FIG. 6C, the portion of the inner side rail 12 on the trailing end 6 side is shifted to the outer side of the slider body 2, thereby making the side space of the inner side rail 12 larger than the side space of the outer side rail 14. In the seventh preferred embodiment shown in FIG. 6D, the portion of the outer side rail 14 on the trailing end 6 side is shifted to the inner side of the slider body 2, thereby making the side space of the outer side rail 14 larger than the side space of the inner side rail 12. In the eighth preferred embodiment shown in FIG. 7A, the portion of the inner side rail 12 on the leading end 4 side is reduced in size, thereby making the side space of the inner side rail 12 larger than the side space of the outer side rail 14. In the ninth preferred embodiment shown in FIG. 7B, the portion of the outer side rail 14 on the leading end 4 side is reduced in size, thereby making the side space of the outer side rail 14 larger than the side space of the inner side rail 12.

Figure 7A:
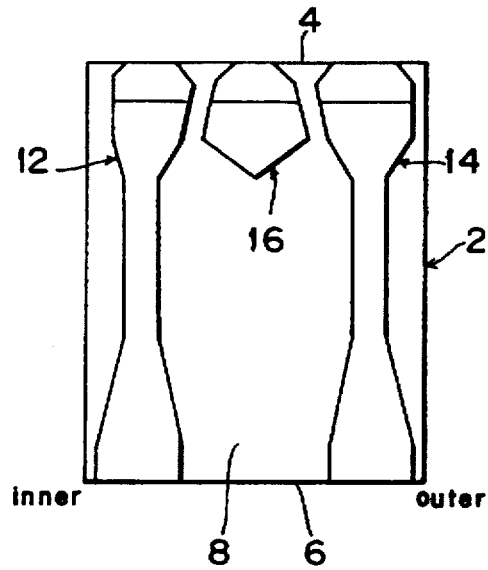
FIGS. 7A to 7D are plan views of magnetic head sliders showing eighth to eleventh preferred embodiments of the present invention, respectively.
Figure 7B:
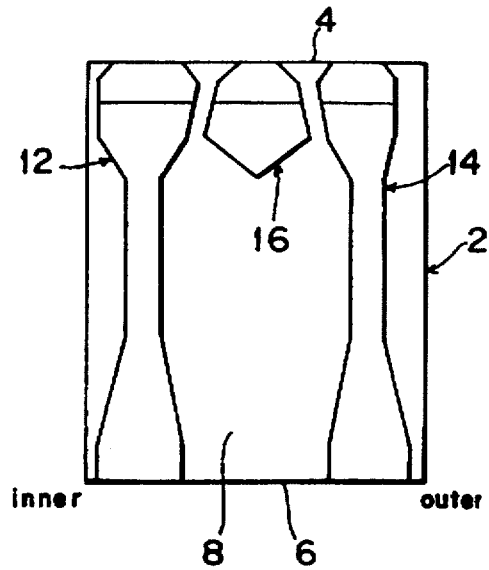
Figure 7C:
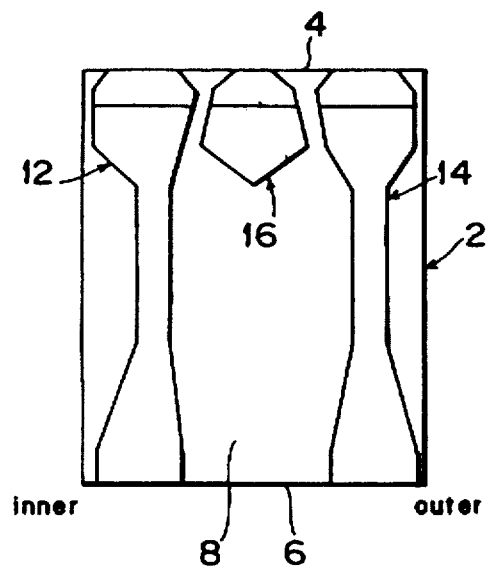
Figure 7D:
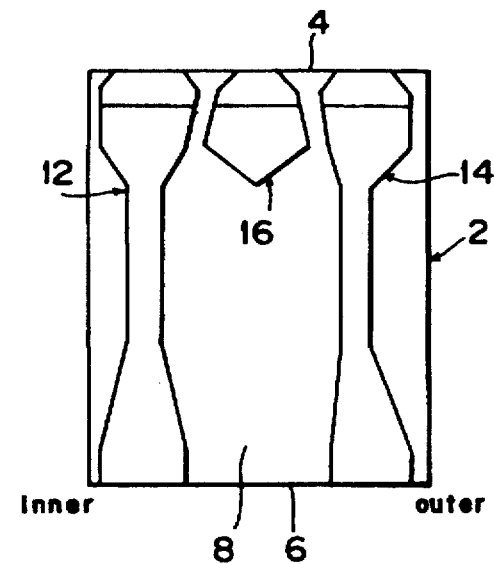

In the tenth preferred embodiment shown in FIG. 7C, the substantially central, narrow portion of the inner side rail 12 is shifted to the outer side of the slider body 2, thereby making the side space of the inner side rail 12 larger than the side space of the outer side rail 14. In the eleventh preferred embodiment shown in FIG. 7D, the substantially central, narrow portion of the outer side rail 14 is shifted to the inner side of the slider body 2, thereby making the side space of the outer side rail 14 larger than the side space of the inner side rail 12.

In the sixth, eighth, and tenth preferred embodiments, the rolling of the magnetic head slider is suppressed in accordance with the principle based on that in the fourth preferred embodiment. In the seventh, ninth, and eleventh preferred embodiments, the rolling of the magnetic head slider is suppressed in accordance with the principle based on that in the fifth preferred embodiment.

Figure 8A:
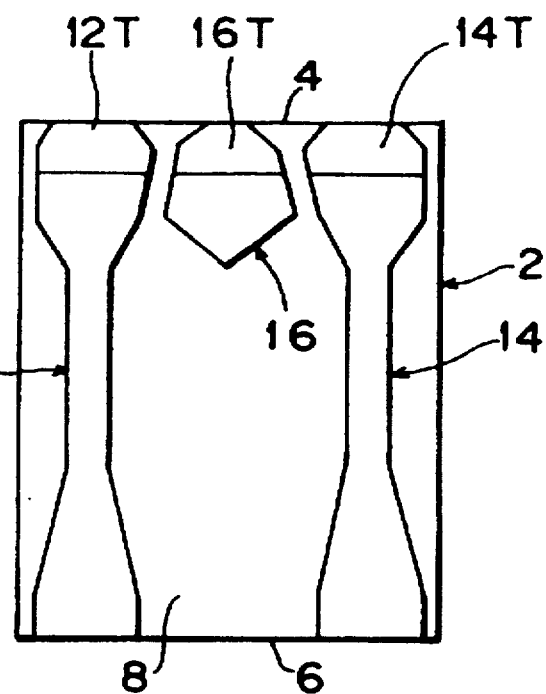
FIGS. 8A and 8B are plan views of magnetic head sliders showing twelfth and thirteenth preferred embodiments of the present invention, respectively.
Figure 8B:
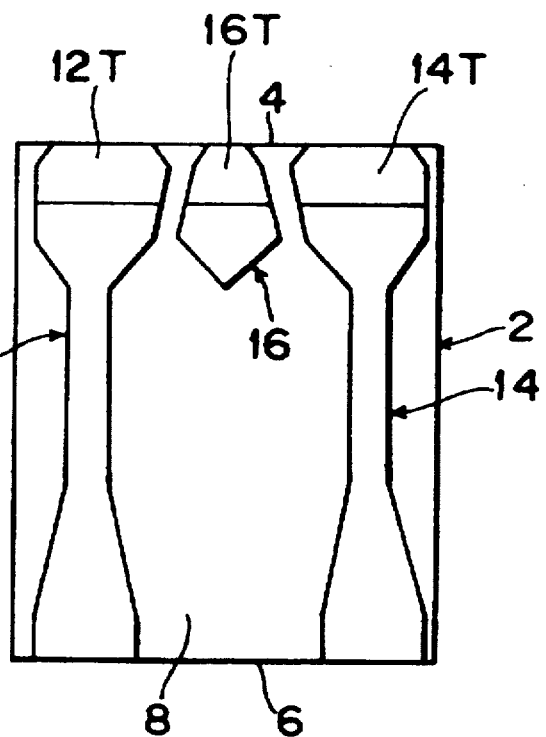

Other two preferred embodiments for suppressing the rolling will now be described with reference to FIGS. 8A and 8B. FIGS. 8A and 8B are plan views showing twelfth and thirteenth preferred embodiments of the present invention, respectively. In these preferred embodiments, the pressure applied to each of the inner side rail 12 and the outer side rail 14 is set larger than the pressure applied to the leading end center rail 16, thereby increasing the rolling rigidity. Accordingly, the rolling of the magnetic head slider due to a change in yaw angle can be suppressed.

In the twelfth preferred embodiment shown in FIG. 8A, the area of each of the leading portions 12T and 14T of the inner and outer side rails 12 and 14 is set substantially equal to the area of the leading portion 16T of the leading end center rail 16, and the tapering angle (the angle defined between the leading portion and the trailing portion) of each of the leading portions 12T and 14T is set smaller than the tapering angle of the leading portion 16T. Accordingly, the pressure applied to each of the inner side rail 12 and the outer side rail 14 becomes larger than the pressure applied to the leading end center rail 16.

In the thirteenth preferred embodiment shown in FIG. 8B, the leading angle of each of the tapering portions 12T and 14T is set substantially equal to the tapering angle of the leading portion 16T, and the area of each of the leading portions 12T and 14T is set larger than the area of the leading portion 16T. Accordingly, the pressure applied to each of the inner side rail 12 and the outer side rail 14 becomes larger than the pressure applied to the leading end center rail 16.

In the case where the leading portion of each rail is formed by machining, the terminating end of the leading portion is sometimes formed with a curved portion (R portion), so as to prevent the leading angle from becoming discontinuous. The floating characteristics of the magnetic head slider is largely dependent upon the form of the curved portion. It is therefore an object of another preferred embodiment of the present invention to provide a magnetic head slider which can suppress the floating fluctuations due to the working tolerance of the curved portion (R portion).

Figure 9A:
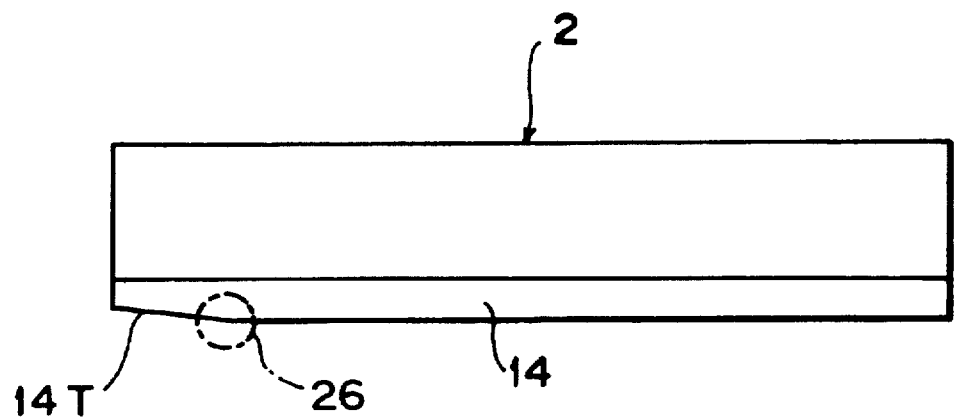
FIGS. 9A and 9B are a side view and an enlarged view of a part therein, respectively, of a magnetic head slider showing a fourteenth preferred embodiment of the present invention.
Figure 9B:
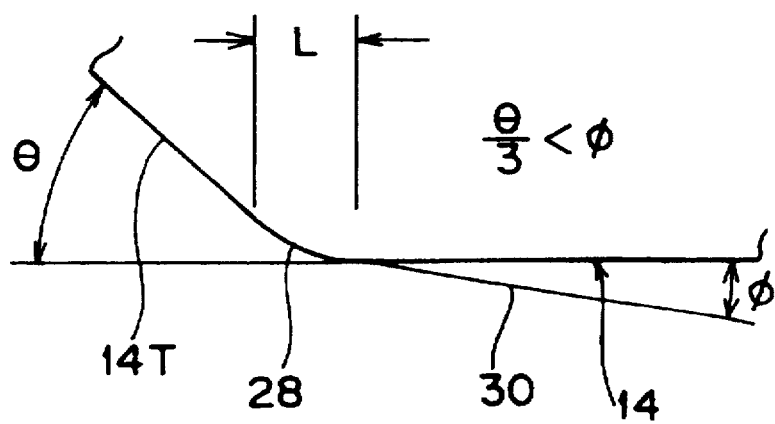

According to this preferred embodiment of the present invention, there is provided a magnetic head slider comprising a slider body having a leading end located upstream of an air flow generated between the slider body and a magnetic recording medium, a trailing end located downstream of the air flow, and a floating surface opposed to the magnetic recording medium; at least two rails provided on the floating surface of the slider body, for generating a floating force; and a magnetic head provided at the trailing end of the slider body, for reading/writing data; wherein a groove formed between the rails is changed in width from the leading end toward the trailing end, thereby generating an attractive force between the floating surface and the magnetic recording medium; each of the rails has a leading portion which gradually increase in thickness from the leading end toward the trailing end; the leading portion has a terminating end at which a curved portion is formed to avoid discontinuity of a tapering angle of the leading portion; and an angle defined between a tangent at a substantial center of the curved portion and a nontapering portion of each rail is larger than ⅓ of the tapering angle. More specifically, this configuration is embodied as follows:

FIG. 9A is a side view of a magnetic head slider showing a fourteenth preferred embodiment of the present invention, and FIG. 9B is an enlarged view of a portion shown by reference numeral 26 in FIG. 9A. Although only the outer side rail 14 is shown in FIGS. 9A and 9B, the leading portions of the other rails are also similarly configured.

As shown in FIG. 9B, the terminating end of the leading portion 14T is formed with a curved portion 28, so as to prevent the tapering angle from becoming discontinuous. That is, the leading portion 14T and the trailing portion are connected by the curved portion 28, and a local tapering angle in the curved portion 28 continuously changes from the leading portion 14T toward the trailing portion and finally converges to 0. Reference symbol θ denotes the tapering angle of the leading portion 14T, and reference symbol φ denotes the angle defined between a line 30 at the substantial center of the curved portion 28 and the trailing portion. This angle φ is substantially equal to an average leading angle in the curved portion 28, so the angle φ will be referred also as "average leading angle". Further, reference numeral L denotes the length of the curved portion 28 measured in a direction parallel to the trailing portion.

The leading angle θ of the tapering portion 14T and the average tapering angle φ of the curved portion 28 are so related as to satisfy the following condition.

θ/3<φ

The reason for this condition will now be described. In general, the average tapering angle of the curved portion 28 is small (e.g., about 0.5°), so that the curved portion 28 undesirably plays a role of the leading portion in the rail. As a result, when the positive pressure in the tapering portion 14T is small, the positive pressure in the curved portion 28 becomes dominant. Accordingly, an allowable range of the average leading angle of the curved portion 28 to be formed by machining becomes narrow, causing a problem in manufacturing. To avoid this problem, the above condition is satisfied according to this preferred embodiment to thereby prevent the positive pressure in the curved portion 28 from becoming dominant, thus suppressing the floating fluctuations due to the working tolerance of the curved portion 28.

Figure 10B:
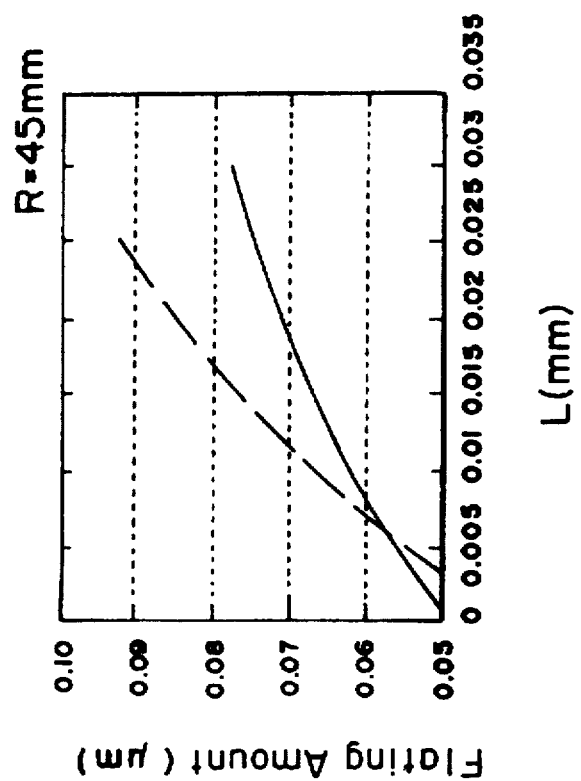
FIGS. 10A and 10B are graphs showing the floating characteristics in the case where the tapering angle is 30.
Figure 10A:
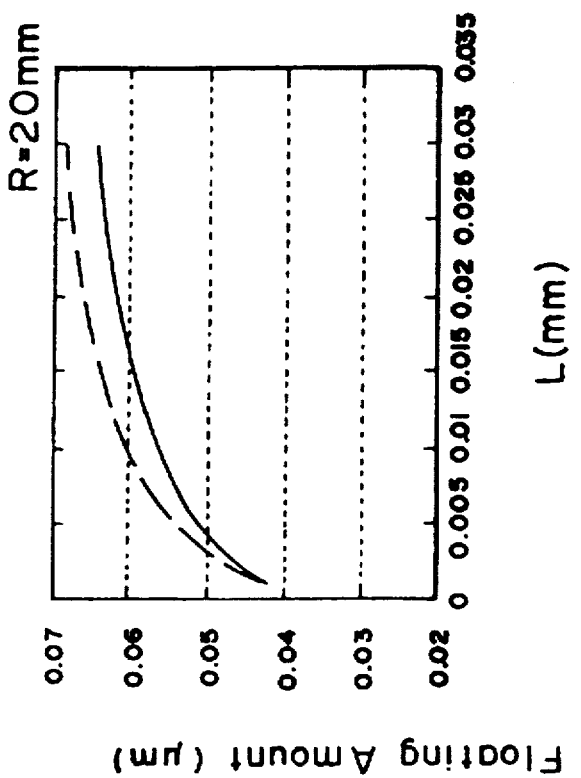

FIGS. 10A and 10B are graphs showing the floating characteristics in the case where the tapering angle θ is 3°. FIG. 10A shows the floating characteristics when the magnetic head slider is positioned on the inner side of a magnetic disk (on the track of R=20 mm), and FIG. 10B shows the floating characteristics when the magnetic head slider is positioned on the outer side of the magnetic disk (on the track of R=45 mm). In each graph, the vertical axis represents a floating amount (μm), and the horizontal axis represents the length L of the curved portion. In each graph, the solid line curve shows the floating amount of the outer side rail at the trailing end, and the broken line curve shows the floating amount of the inner side rail at the trailing end. In both graphs, it is apparent that the floating amount largely changes in dependence upon the length L of the curved portion.

FIGS. 11A and 11B are graphs respectively corresponding to FIGS. 10A and 10B, in the case that the tapering angle θ is 1.5°. As apparent from FIGS. 11A and 11B, the floating amount is substantially constant regardless of a change in the length L of the curved portion. In this manner, the reduction of the tapering angle θ to less than 2° allows suppression of the variations in floating amount due to the working tolerance of the curved portion.

Figure 12:
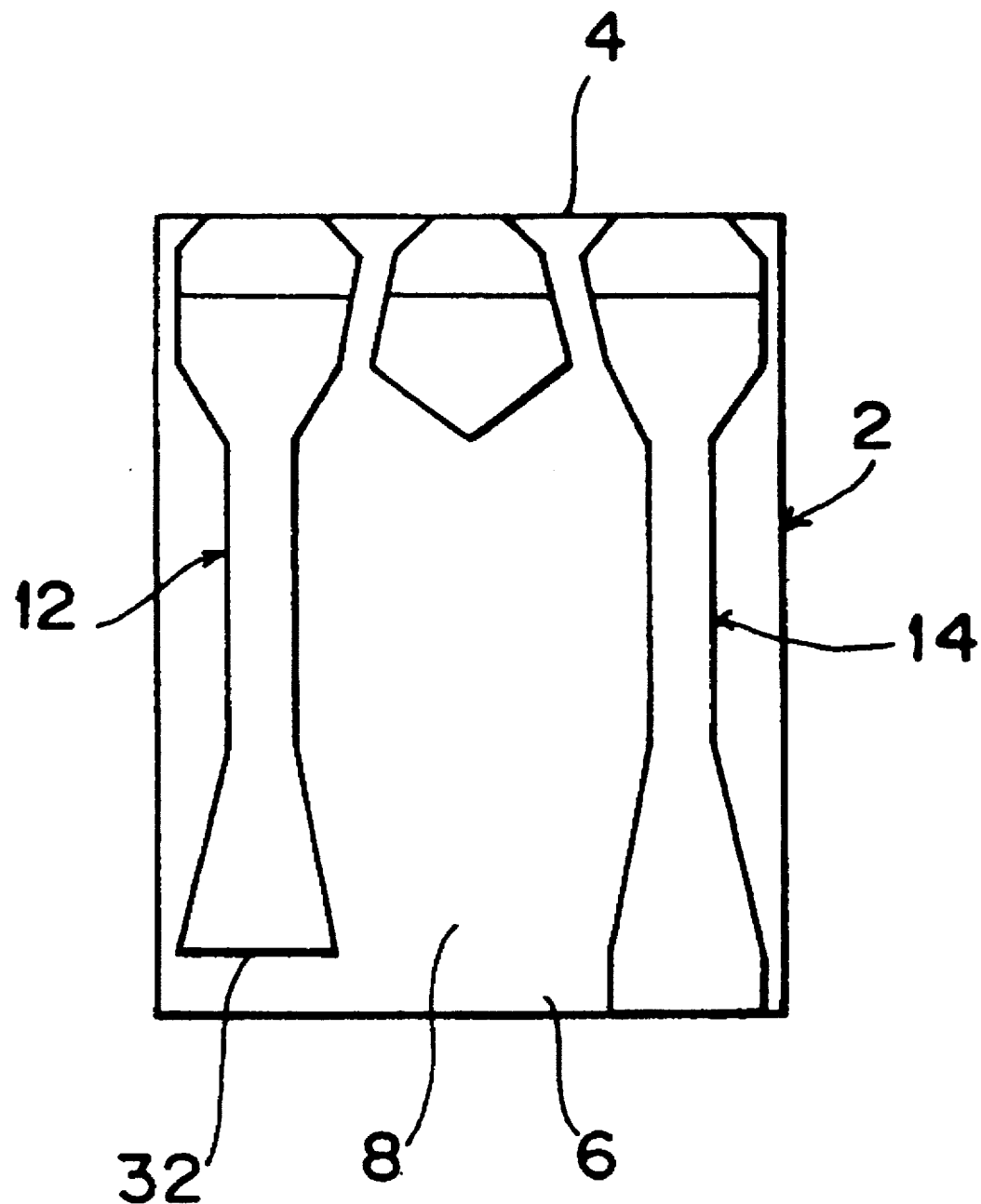
FIG. 12 is a plan view of a magnetic head slider showing a fifteenth preferred embodiment of the present invention.

Another preferred embodiment of the magnetic head slider improved in the rolling characteristics will now be described. According to this preferred embodiment of the present invention, there is provided a magnetic head slider meeting a condition that a maximum yaw angle is 10°, comprising a slider body having a leading end located upstream of an air flow generated between the slider body and a magnetic recording medium, a trailing end located downstream of the air flow, and a floating surface opposed to the magnetic recording medium; an outer side rail and an inner side rail provided on the floating surface of the slider body; and a magnetic head provided at the trailing end of the slider body at a position corresponding to the outer side rail, for reading/writing data; wherein a groove formed between the outer side rail and the inner side rail is changed in width from the leading end toward the trailing end, thereby generating an attractive force between the floating surface and the magnetic recording medium; and a distance between a rear end of the inner side rail and the trailing end is larger than a distance between a rear end of the outer rail and the trailing end. More specifically, this configuration is embodied as follows:

FIG. 12 is a plan view of a magnetic head slider showing a fifteenth preferred embodiment of the present invention. In contrast with the second preferred embodiment shown in FIG. 4, the fifteenth preferred embodiment is characterized in that a rear end 32 of the inner side rail 12 is not coincident with the trailing end 6, but is retracted from the trailing end 6 toward the leading end 4. That is, the length of the inner side rail 12 is smaller than the length of the outer side rail 14. According to this preferred embodiment, when the magnetic head slider is positioned on the outer side of a magnetic disk rotationally driven, the floating amount of the outer side rail 14 can be adjusted to a relatively high value, and the floating amount of the inner side rail 12 can be adjusted to a relatively low value, thereby reducing the rolling of the magnetic head slider.

As described above, according to the present invention, it is possible to provide a magnetic head slider which has floating characteristics less influenced by working variations of the leading portion, a magnetic head slider which has improved rolling characteristics, and a magnetic head slider which has floating characteristics less influenced by working variations of the curved portion.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A magnetic head slider comprising:

a slider body having a leading end located upstream of an air flow generated between said slider body and a magnetic recording medium, a trailing end located downstream of said air flow, and a floating surface opposed to said magnetic recording medium;

first and second side rails provided on said floating surface of said slider body, for generating a floating force;

a leading end center rail provided between said first and second side rails on said floating surface of said slider body in the vicinity of said leading end, wherein a distance between a rear end of one of said first and second side rails and said trailing end is smaller than a distance between a rear end of said leading end center rail and said trailing end;

a magnetic head provided at said trailing end of said slider body, for reading/writing data;

wherein a groove formed between said first side rail and said second side rail is changed in width from said leading end toward said trailing end, thereby generating an attractive force between said floating surface and said magnetic recording medium;

at least one of said rails having a widening portion which gradually widens in width from said leading end toward said trailing end followed by a narrowing portion which gradually narrows in width in said direction, each of said first and second side rails and said leading end center rail further having a leading portion with a terminating end, wherein said leading portion of said at least one of said rails gradually increases in thickness from said leading end toward said trailing end, said leading portion of said at least one of said rails increasing in thickness through said widening portion to said terminating end in said narrowing portion.

2. A magnetic head slider according to claim 1, further comprising:

a first narrow groove formed between said first side rail and said leading end center rails; and a second narrow groove formed between said second side rail and said leading end center rail, wherein said first and second narrow grooves are not parallel to side surfaces of said slider body and have a substantially uniform width.

3. A magnetic head slider according to claim 1, wherein a distance between a rear end of said first side rail and said trailing end is larger than a distance between a rear end of said second side rail and said trailing end.

4. A magnetic head slider according to claim 1, wherein said first and second side rails are unsymmetrical in shape with respect to each other.

5. A magnetic head slider according to claim 1, wherein said first and second side rails are deviated in position toward one side of said slider body.

6. A magnetic head slider according to claim 1, wherein said leading portion of each of said first and second side rails and said leading end center rail is formed such that a pressure applied to each of said first and second side rails is larger than a pressure applied to said leading end center rail.

7. A magnetic head slider according to claim 6, wherein an area of said leading portion of each of said first and second side rails is substantially equal to an area of said leading portion of said leading end center rail; and a tapering angle of said leading portion of each of said first and second side rails is smaller than a tapering angle of said leading portion of said leading end center rail.

8. A magnetic head slider according to claim 6, wherein a tapering angle of said leading portion of each of said first and second side rails is substantially equal to a tapering angle of said leading portion of said leading end center rail; and an area of said leading portion of each of said first and second side rails is larger than an area of said leading portion of said leading end center rail.

9. A magnetic head slider according to claim 1, wherein at least one said terminating end has a curved portion formed to avoid discontinuity of a tapering angle of said leading portion, said tapering angle being defined between said leading portion and an extended line of a trailing rail portion; and an angle defined between a line tangent to a substantial center of said curved portion and said trailing rail portion is larger than $\frac{1}{3}$ of said leading angle.

10. A magnetic head slider according to claim 9, wherein said leading angle is smaller than 2°.

11. A magnetic head slider comprising:

a slider body having a leading end located upstream of an air flow generated between said slider body and a magnetic recording medium, a trailing end located downstream of said air flow, and a floating surface opposed to said magnetic recording medium;

at least two rails provided on said floating surface of said slider body, for generating a floating force;

a magnetic head provided at said trailing end of said slider body, for reading/writing data;

a groove defined between said rails is changed in width from said leading end toward said trailing end, thereby generating an attractive force between said floating surface and said magnetic recording medium;

each of said rails having a narrowing portion which gradually narrows in width in a direction from said leading end toward said trailing end and a widening portion which gradually widens in width in said direction, each of said rails further having a leading portion which gradually increases in thickness from said leading end toward said trailing end, said leading portion stops increasing in thickness at a terminating end where at least one of said rails narrows in width from said leading end toward said trailing end;

said rails including first and second side rails and a leading end center rail provided between said first and second side rails on said floating surface of said slider body in the vicinity of said leading end, said leading portion of each of said first and second side rails and said leading end center rail is formed such that a pressure applied to each of said first and second side rails is larger than a pressure applied to said leading end center rail;

wherein an area of said leading portion of each of said first and second side rails is substantially equal to an area of said leading portion of said leading end center rail; and a tapering angle of said leading portion of each of said first and second side rails is smaller than a tapering angle of said leading portion of said leading end center rail.

* * * * *

UNITED STATES PATENT AND TRADEMARK OFFICE
CERTIFICATE OF CORRECTION

PATENT NO. : 5,894,379
DATED : April 13, 1999
INVENTOR(S) : Koishi et al.

It is certified that error appears in the above-identified patent and that said Letters Patent is hereby corrected as shown below:

Column 2, line 47, delete "30" and insert

--3°-- therefor

Column 5, line 19, delete "100" and insert

--10°-- therefor

Signed and Sealed this

Ninth Day of May, 2000

Attest:

Q. TODD DICKINSON

*Attesting Officer*  *Director of Patents and Trademarks*